United States Patent Office 3,229,274
Patented Jan. 11, 1966

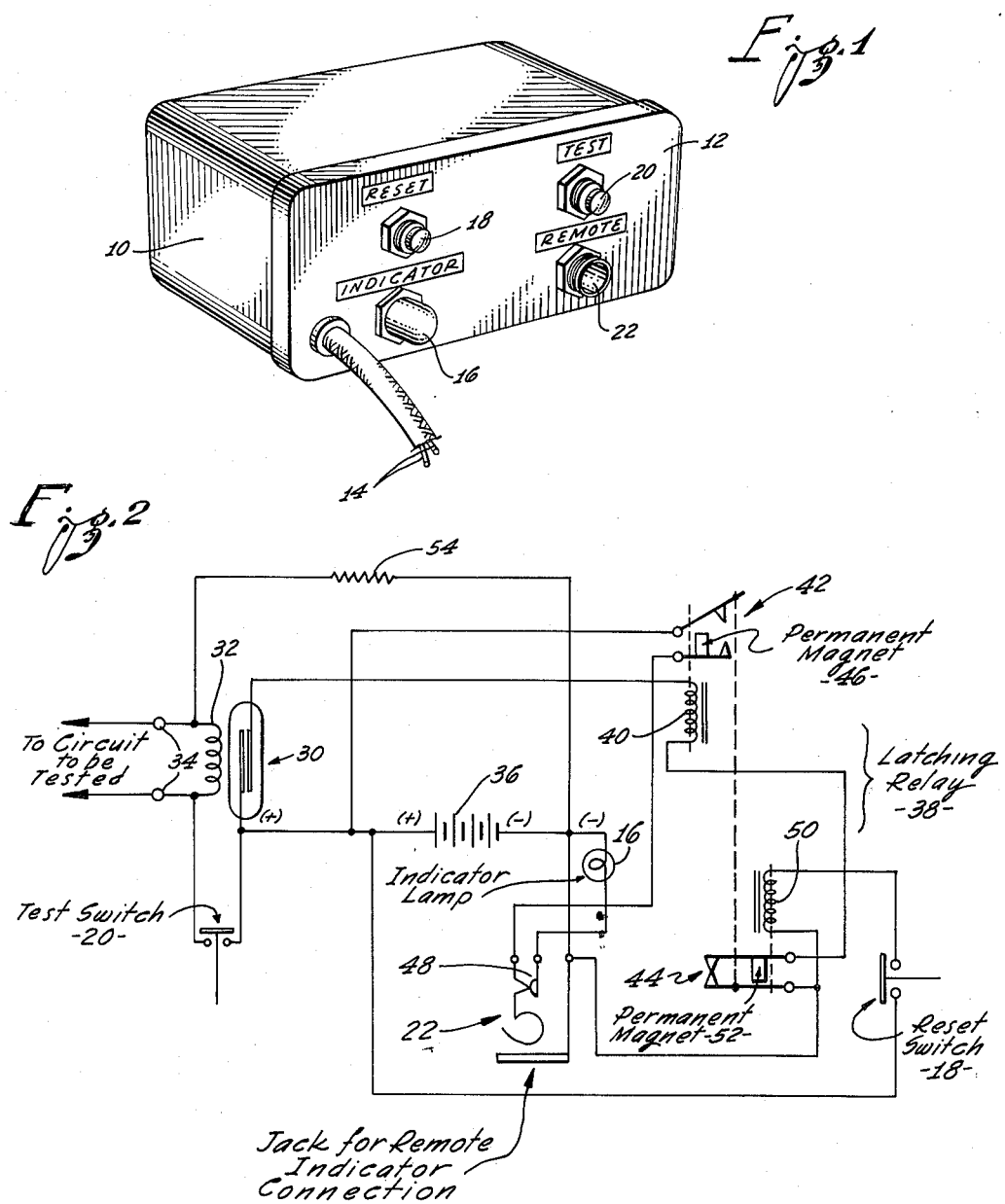

3,229,274
STRAY ENERGY DETECTOR
Arthur W. Riley, Sylmar, and Oscar B. Robey, Reseda, Calif., assignors to Assembly Engineers, Inc., Los Angeles, Calif., a corporation of California
Filed Apr. 29, 1963, Ser. No. 276,384
3 Claims. (Cl. 340—213)

The present invention relates to systems for detecting stray energy; and it relates more particularly to an improved instrument and system for sensing and indicating the presence of stray energy which exists in the form of alternating current or direct current electric potentials.

The instrument and system of the invention finds particular utility in installations such as missile firing systems. In such installations, electrically actuated squibs are often used to initiate the firing apparatus of the missile.

It is extremely important that the electric circuits which actuate the squibs be tested prior to their connection thereto, so as to be certain that no stray electric potentials exist in the circuits. Such stray potentials could establish an unwanted pre-firing of the squibs.

Although the detector system of the invention finds particular utility in missile firing systems, as described above, it will become evident as the description proceeds that the system has general utility in any application wherein it is desired to provide an indication of the presence of stray energy, and especially where such stray energy could otherwise create a hazardous condition.

The instrument of the invention is constructed, for example, to be plugged into the squib activating circuit to be tested. This procedure is usually carried out during the preliminary check-out routine of the missile firing system.

The input impedance of the system of the invention is matched to the impedance of the squib, or other circuit element, which it replaces.

The detection of a stray voltage in the activating circuit by the instrument of the invention is indicated, for example, by a lamp, or other suitable indicator, mounted directly on the instrument itself.

Provisions are made in the unit to be described for the connection of remotely situated indicators into the overall system. The remote indicators may be mounted, for example, on a control board in a central station, or in any other convenient location.

The system of the invention is capable of detecting the presence of an alternating or direct current voltage in the activating circuit, when such a voltage exceeds a selected minimum threshold. The instrument is extremely sensitive, and this threshold is selected on the basis of the firing level of the squib, or other circuit element which is to be controlled by the activating circuit.

It is obvious that the squib, or other element, will be plugged into the activating circuit for subsequent activation, only if the instrument of the invention indicates that the stray energy level in the activating circuit is below the danger threshold.

The detector system to be described is constructed to respond to the presence of an alternating or direct current voltage above the selected minimum threshold, as mentioned above. The indicator of the instrument is energized by such a voltage, and remains energized, regardless of whether or not the voltage is continuous or intermittent.

The detector system of the invention is constructed so that once the associated indicator is energized, it remains energized until the system is reset. This assures that even the brief occurrence of a stray energy condition will be detected by the instrument.

A feature of the invention is the provision of a detector system which includes a relay circuit for controlling the energization of the above-mentioned indicator, and which relay circuit is automatically cut out once the indicator is energized; the indicator continuing to be energized by a direct circuit to the energizing source. This feature eliminates long duration current flows in the relay energizing circuits, and it obviates the resultant deleterious effects of prolonged current flows on such energizing circuits.

Another feature of the invention is the inclusion of its power supply in the housing of the instrument, so as to provide a fully portable unit, when so desired.

The system of the invention in the embodiment to be described also includes the provision of a check-out circuit. This circuit permits a simple self-checking means for the instrument prior to each use.

The above feature is most important when the instrument of the invention is used to detect stray energy which would otherwise create a hazardous condition. The use of the check-out circuit assures that the instrument is operating properly, and that when the indication is that there is no stray energy above the danger point, that the indicated "safe" condition actually exists.

An object of the invention, therefore, is to provide an improved system and instrument for detecting and indicating continuous or intermittent stray energy, which energy exists in the form of alternating current or direct current potentials.

Another object of the invention is to provide such an improved system which is extremely sensitive in its capabilities of sensing stray energy.

Yet another object is to provide such an improved system and instrument which may be extremely small in size, light in weight, and which is extremely simple in its construction and easy to operate.

A further object of the invention is to provide such an improved system and instrument which is extremely reliable in its operation.

A still further object is to provide such an improved system which exhibits an extremely rapid response to the presence of stray energy above the pre-selected threshold.

Other objects and advantages of the system and instrument of the invention will become apparent from a consideration of the following description, when the description is taken in conjunction with the accompanying drawing, in which:

FIGURE 1 is a perspective view illustrating an essentially full-scale representation of an instrument constructed in accordance with the invention; and FIGURE 2 is a circuit diagram of one embodiment of the system of the invention.

As illustrated in FIGURE 1, the instrument of the present invention may be housed in a relatively small casing 10. This casing may measure, for example, 2" x 2" x 4½". The weight of a constructed embodiment is of the order of 22 ounces.

The casing can include a front panel 12 on which the various controls and indicators of the system are mounted. Mounted on the front panel 12 are a pair of leads 14 which are used to connect the instrument to the activating circuit to be tested. An indicator lamp 16, or other appropriate electrically activated indicating means, is also mounted on the control panel 12.

A pair of spring-loaded push-button switches 18 and 20 are also mounted on the panel 12. The switch 18 is used, for example, to reset the system, whereas the switch 20 is used as a test switch for self-checking purposes.

An electric jack 22 is also mounted on the front panel 12. This jack is adapted to receive an electric plug which serves to connect the unit to remote indicators, as mentioned above.

As best shown in FIGURE 2, the system includes a reed type switching relay 30. The relay, in turn, includes a pair of normally open contacts of a reed-like configuration, the contacts being resiliently supported within an enclosing envelope.

The reed switching relay 30 also includes an energizing coil 32. The impedance of the energizing coil 32 is matched to the impedance of the squib, or other circuit element, which is to be activated by the activating circuit.

The energy detecting system of the invention also includes a pair of input terminals 34 which are connected to the coil 32. The input terminals 34 are adapted to be connected to the activating circuit to be tested by the system.

The system includes a source of undirectional potential 36. This source is preferably in the form of a miniature battery, which may be included in the housing 10, so as to render the unit a self-contained portable assembly.

The system of the invention also includes a latching relay 38. The latching relay 38 includes a first energizing coil 40, and it includes a pair of normally open contacts 42 and a pair of normally closed contacts 44. The contacts 42 and 44 are mechanically coupled to one another, so that when the contacts 42 are closed, the contacts 44 are opened, and vice versa.

The latching relay 38 is constructed so that when the relay coil 40 is energized, the contacts 42 are closed, and the contacts 44 are opened. A permanent magnet 46 is provided to hold the contacts 42 closed, upon the subsequent deenergization of the coil 40.

The energizing coil 40 is connected across the source 36 by a circuit which includes the normally open contacts of the reed switching relay 30, and the normally closed contacts 44 of the latching relay 38.

The indicator lamp 16, on the other hand, is connected across the source 36 by a circuit which includes the normally open contacts 42 of the latching relay 38, and a pair of normally closed contacts 48 in the jack 22.

The jack 22 is connected across the indicating lamp 16. The jack provides a circuit for an external indicating means, which may be connected to an appropriate plug. When the plug is inserted in the jack 22 it causes the switch 48 to open, so as to deenergize the indicating lamp 16, and it establishes a circuit to a similar remote indicating means.

The latching relay 38 also includes a second energizing coil 50 which serves to reset the detecting system. The energizing coil 50 responds to an energizing current to close the contacts 44 and thereby open the contacts 42. This latter coil is connected across the source 36 by a circuit which includes the reset switch 18.

A permanent magnet 52 is associated with the contacts 44, so as to hold these contacts in a closed condition, after the coil 50 has been subsequently deenergized.

The test switch 20 is connected between the positive terminal of the source 36 and one of the input terminals 34. The test circuit is completed by a resistor 54 which is connected between the negative terminal of the source 36 and the other input terminal.

The circuit of FIGURE 2 represents the system in its operating condition prior to use. As a preliminary step, the test switch 20 is depressed to establish the self-checking feature. The resistor 54 is selected so that when the switch 20 is closed, the potential applied across the coil 32 represents the critical threshold of the stray energy to be detected.

If the detecting system of FIGURE 2 is operating properly, the closure of the test switch 20 will cause the reed contacts of the relay 30 to close, thereby energizing the coil 40 of the latching relay 38; this energizing circuit being established through the normally closed contacts 44.

The energization of the coil 40 causes the contacts 42 to close and the contacts 44 to open. The contacts 42 are held closed by the permanent magnet 46. However, the energizing circuit to the coil 40 is opened by the opening of the contacts 44, so as to avoid the prolonged flow of energizing current through the relay coils.

The closure of the contacts 42 completes the energizing circuit to the indicator lamp 16, so that the lamp is energized. Therefore, the energization of the lamp 16 upon the closure of the test switch 20 indicates that the system is operating properly.

To reset the detecting system of FIGURE 2, the reset switch 18 is closed so as to energize the coil 50. The energization of the coil 50 causes the contacts 44 to close, and the contacts 42 to open. The contacts 44 are then held closed by the permanent magnet 52, after the reset switch 18 is opened. In this manner, the system is restored to its original operating condition.

The terminals 34 are then plugged into the activating circuit to be tested. If there are no stray potentials in the activating circuit above the critical threshold, the safe condition is indicated by the lack of energization of the lamp 16.

However, the presence of a stray potential above the critical level, even briefly, causes the contacts of the reed switching relay 30 to close. This closure of the contacts of the relay 30 closes the contacts 42 of the latching relay 38, as before. Then, even though the contacts of the relay 39 open immediately due to the intermittent nature of the stray energy, the contacts 42 remain closed by the action of the permanent magnet 46, so that the lamp 16 continues to glow.

As mentioned above, the jack 22 is adapted to receive a plug which connects the system to a remote indicator lamp, similar, for example, to the lamp 16. When the plug is plugged into the jack 22, the resulting opening of the contacts 48 causes the lamp 16 to be disconnected, and causes it to be replaced by the remote indicator.

A constructed embodiment of the invention exhibits a range of sensitivity of from 10 to 20 millivolts. Adjustment of the relay switch 30 permits a minimum value of sensitivity to be set as required.

As mentioned above, the impedance of the relay coil 32 is matched to the squib, or other element, to be actually activated by the circuit to be tested.

The constructed embodiment exhibits a response time of the order of .005 second between the application of a voltage to the input terminals 34 to the illumination of the indicating lamp 16.

The invention provides, therefore, an improved system which is simple and compact, and yet which is extremely reliable in its operation.

While a particular embodiment of the invention has been shown and described, it is apparent that modifications may be made. The claims are intended to cover all modifications which fall within the scope of the invention.

What is claimed is:

1. A system for sensing stray energy in an activating circuit, and the like, including:
first relay means having a first energizing coil and normally open first contacts;
means connected to said first energizing coil for interposing said coil across the activating circuit;
a source of energizing potential;
electrically actuated indicating means connected to said source;
a latching second relay means having a second energizing coil, and further having normally open second contacts connected in circuit with said indicating means and said source, and further having third normally closed contacts in circuit with the said second energizing coil, said third contacts being mechanically coupled to said second contacts for actuating the second and third contacts in a related movement wherein the closed contacts of the couple are actuated to an open condition as the closed contacts of the couple are actuated to an open condition, and further having means for latching said second and third contacts in their open condition and in their closed condition;

a third energizing coil, a power circuit manually operative to energize said third coil, said third coil adapted when energized to actuate the second and third contacts to their said normal condition; and circuit means including said normally open first contacts and said normally closed third contacts for connecting said second energizing coil across said source.

2. The system defined in claim 1 in which said latching means are in the form of permanent magnets.

3. The system defined in claim 1 and which includes further circuit means including a test switch and series resistance means connecting said first energizing coil across said source.

References Cited by the Examiner
UNITED STATES PATENTS 3,041,588   6/1962   Malin _____ 340—213

NEIL C. READ, *Primary Examiner*.